United States Patent [19]
Avery

[11] Patent Number: 5,600,525
[45] Date of Patent: Feb. 4, 1997

[54] ESD PROTECTION CIRCUIT FOR INTEGRATED CIRCUIT

[75] Inventor: Leslie R. Avery, Flemington, N.J.

[73] Assignee: David Sarnoff Research Center Inc, Princeton, N.J.

[21] Appl. No.: 291,809

[22] Filed: Aug. 17, 1994

[51] Int. Cl.[6] .................................................... H02H 9/04
[52] U.S. Cl. ........................ 361/56; 361/91; 361/111
[58] Field of Search .............................. 361/56, 91, 111

[56] References Cited

U.S. PATENT DOCUMENTS

| | | | |
|---|---|---|---|
| 3,886,432 | 5/1975 | Piccone et al. | 361/56 |
| 4,066,918 | 1/1978 | Heuner et al. | 361/56 |
| 4,323,942 | 4/1982 | Hartman et al. | 361/56 |
| 4,405,933 | 9/1983 | Avery | 357/13 |
| 4,484,244 | 11/1984 | Avery | 361/56 |
| 5,010,380 | 4/1991 | Avery | 357/23.13 |
| 5,072,273 | 12/1991 | Avery | 357/38 |
| 5,274,262 | 12/1993 | Avery | 257/362 |
| 5,343,053 | 8/1994 | Avery | 257/173 |

Primary Examiner—Todd DeBoer
Attorney, Agent, or Firm—William J. Burke

[57] ABSTRACT

An ESD protection circuit includes a portion for protecting a pair of power lines and a portion for protecting an I/O pin. The power line protection portion includes at least three SCRs electrically connected in series between the power lines. A zener diode is electrically connected between a gate of the SCR at one end of the series and the negative power line, and a resistor is electrically connected between the gate of the one SCR and the positive power line. The gates of the other SCRs in the series are electrically connected to the negative power line or to their own cathode. The I/O pin protection portion includes a plurality of SCRs connected in series between the power lines with the I/O pin being connected between the SCR at one end of the series and the next adjacent SCR in the series. A separate zener diode is electrically connected between the gate of the SCR at the one end of the series and the gate of the next adjacent SCR and the negative power line. A separate resistor is connected between the gate of the SCR at the one end of the series and the next adjacent SCR and the positive power line. The gates of the other SCRs in the series are connected to the negative power line or to their own cathode.

20 Claims, 3 Drawing Sheets

ESD PROTECTION CIRCUIT FOR INTEGRATED CIRCUIT

The present invention is directed to an electrostatic (ESD) protection circuit for integrated circuits (ICs), and, more particularly to an ESD protection circuit for the power supply and input/output (I/O) pads of a low voltage submicron IC.

BACKGROUND OF THE INVENTION

As ICs have increased in size to include larger number of circuit elements, the geometry of the circuit elements has decreased in order to maintain the overall size of the IC relatively small. With decreasing geometries of the circuit elements, providing adequate levels of ESD protection has become increasingly more difficult. In MOS circuits the gate oxide thickness has decreased to below 1000 nanometers (nm), and breakdown voltages are often less than 10 volts. Fowler Nordheim (FN) tunneling through the oxide can occur as low as 7 volts. Device junction breakdown voltages, which are often used to protect the sensitive gate oxide directly, or to trigger a protection structure such as a snap-back device, have remained high to minimize hot carrier generation. In many cases, the minimum junction breakdown voltage is above the gate breakdown voltage. Supply voltages have also been reduced. For circuit devices having geometries down to 0.8 microns, supply voltages have been held at 5 volts. However, below that level, either dual supply (5 volts and 3.3 volts) supplies, or a single 3.3 volt supply have been used. The 3.3 volt supply can be as high as 4.5 volts for burn-in.

Lower voltage clamping or triggering structures, such as zener diodes, have been used for ESD protection. Such devices have been made using the lightly doped drain (LDD) diffusions and heavier source/drain diffusions of the MOS transistors of the IC to form zener diodes in the 6–8 volt range. However, since FN tunneling occurs around 7 volts, these zener diodes do not provide adequate I/O and gate protection for large ESD pulses if used to trigger larger energy handling circuits. Lower voltage diodes cannot be easily made without adding additional process steps, and would tend to be leaky due to band to band tunneling.

Attempts have been made to provide ESD protection using a series of stacked diodes. However, these suffer from a basic problem relating to the temperature coefficient of the diodes. The temperature coefficient of a single diode is about −2 mv/° C. Over the normal operating temperature range of −55° C. to 125° C., the change in voltage is about 140 mv. For a ten diode stack, the change would be 1.4 volts. This change is sufficient to make a compromise between low leakage at high temperatures and adequate voltage protection margin at low temperature virtually impossible. Therefore, an alternate approach is necessary.

SUMMARY OF THE INVENTION

The invention is an ESD protection circuit for a circuit having a pair of power lines includes a plurality of SCRs electrically connected in series between the power lines. Each of the SCRs has a gate, and a zener diode is electrically connected between the gate of the SCR at one end of the series and one of the power lines. The gates of the other SCRs in the series are electrically connected to the one power line. In its on state the SCR has a very slight positive temperature coefficient, making it an ideal clamping device for a wide temperature range.

The invention is also an ESD protection circuit for a circuit having a pair of power lines and an I/O pin. A first plurality of SCRs are electrically connected in series between the power lines. A second plurality of SCRs are electrically connected in series between the power lines with the I/O pin being connected between the SCR at one end of the second series and the next adjacent SCR. Each of the SCRs of the first and second series has a gate, a cathode and an anode. A separate zener diode is electrically connected between the gate of the SCR at one end of each of the first and second series and one of the power lines. The gates of the other SCRs of each of the first and second series are electrically connected to the one power line.

DETAILED DESCRIPTION

Figure 1:
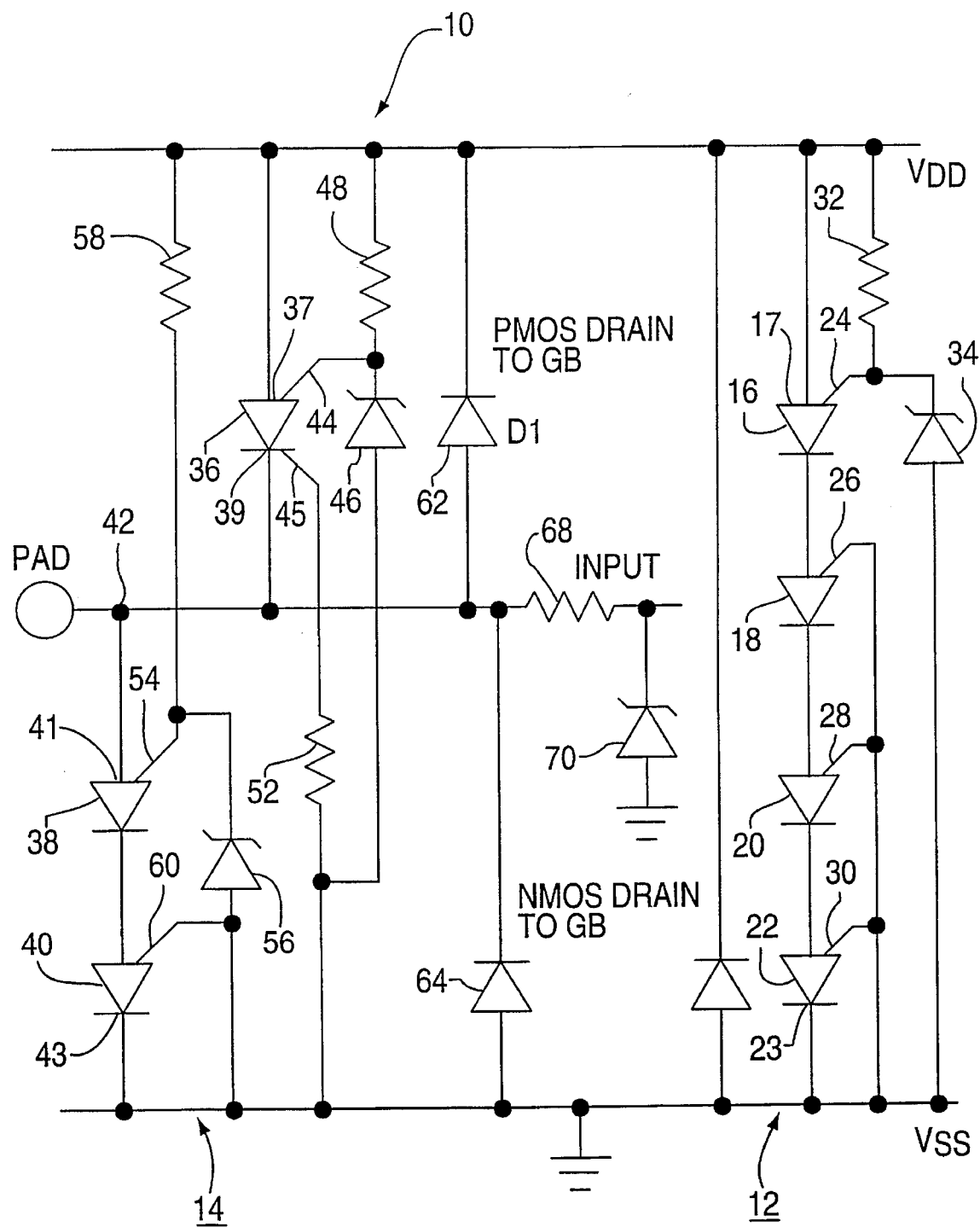
FIG. 1 is a circuit diagram of the ESD protection circuit of the invention.

For protection against damage from an ESD event in normal ICs, it is necessary to protect all input, output and input/output (I/O) leads, plus all power supply leads. For several reasons the I/O leads are usually more sensitive to ESD than the power supply leads, requiring lower trigger and clamping voltages. In FIG. 1, an ESD protection circuit 10 of the invention is shown. In the circuit 10, the circuit portion 12 provides ESD protection for the power supply leads, and the circuit portion 14 provides ESD protection for the I/O leads.

The power supply protection circuit 12 comprises a plurality of series connected SCRs between the power lines Vss and Vdd. As shown, there are four of the series connected SCRs, 16, 18, 20 and 22 with the anode 17 of the SCR 16 at one end of the series being connected to the positive power line Vdd and the cathode 23 of the SCR 22 at the other end of the series being connected to the negative power line Vss. However, the series of SCRs could include more or less than four depending on the power supply requirements. The lower three SCRs, 18, 20 and 22, have their second gates, 26, 28 and 30 respectively, connected to the negative power line Vss so as to turn the SCRs 18, 20 and 22 on when current flows through SCR16. The first gates (not shown) of the SCRs 16, 18, 20 and 22 are connected to ground through a resistor. The SCR 16 at the top end of the series has its second gate 24 connected to the positive power supply line Vdd through a resistor 32. This effectively keeps the top SCR 16 in an off state. A small low voltage zener diode 34, usually about 6 volts, is connected between the second gate 24 of the top SCR 16 and the negative supply line Vss or ground.

In the normal operation of the circuit 10, the top SCR 16 is off and only a small leakage current, usually less than one nanoampere, flows through the zener diode 34. When a transient voltage is applied to the supply line Vdd, the zener diode 34 holds the second gate 24 of the top SCR 16 at the voltage of the zener diode 34. As soon as the anode voltage of the top SCR 16 exceeds the voltage at the second gate 24 by a Vbe, approximately 0.6 volts, the top SCR 16 turns on, currnet flows through SCRs 18, 20 and 22, and the transient voltage is clamped at approximately 1.3 voltage for every SCR 16, 18, 20 and 22 in the series.

Figure 3:
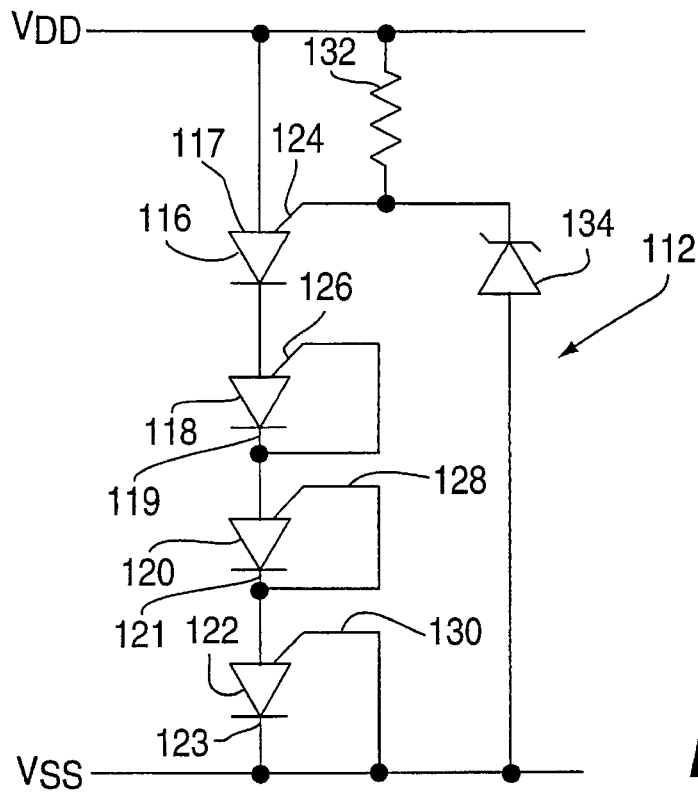
FIG. 3 is a modification of the power supply protection circuit of FIG. 1.

Referring to FIG. 3, a modification of the power supply protection circuit 12 shown in FIG. 1 is generally designated as 112. Power supply protection circuit 112 includes a plurality of series connected SCRs 116, 118, 120 and 122 connected between the positive power line Vdd and the negative power line Vss. The SCR 116 at one end of the series has its anode 117 connected to the positive power line Vdd and its second gate 124 connected to the positive power supply line Vdd through a resistor 132. A small voltage zener diode 134 is connected between the second gate 124 of the SCR 116 and the negative supply line Vss or ground. The other three SCRs, 118, 120 and 122, each have their second gates 126, 128 and 130 respectively, connected to their own cathodes 119, 121 and 123 respectively. For the SCR 122 at the other end of the series, its cathode 123 and second gate 130 are also connected to the negative supply line Vss. Each of the other two SCRs 118 and 120 has its second gate 126 and 128 respectively connected to the negative supply line Vss through the adjacent SCRs in the series. In integrated circuit form, where the first gate is a common P-type substrate, the first gates of SCRs 118, 120 and 122 are also connected to ground through the substrate resistance. The protection circuit 112 operates in the same manner as the protection circuit 12, described above, except that there is provided a lower leakage current between Vdd and Vss.

Figure 4:
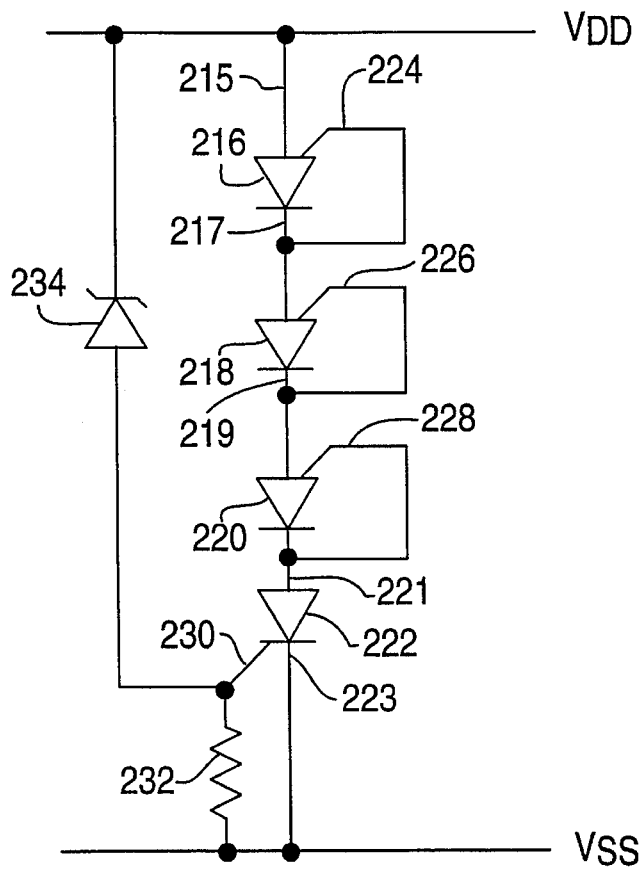
FIG. 4 illustrates a further modification of the power supply protection circuit shown in FIG. 1.

Referring to FIG. 4 (simplified), a further modification of the power supply protection circuit 12 shown in FIG. 1 is generally designated as 212. Power supply protection circuit 212 includes a plurality of series connected SCRs 216, 218, 220 and 222 connected between the positive power line Vdd and the negative power line Vss. The SCR 222 at one end of the series has its cathode 223 connected to the negative power line Vss and its first gate 230 connected to Vss through a resistor 232. A small voltage zener diode 234 is connected between the first gate 230 of the SCR 222 and the positive supply line Vdd. The other three SCRs, 216, 218 and 220, each have their second gates 224, 226 and 228 respectively, connected to their own cathodes 217, 219 and 221 respectively. For the SCR 216 at the other end of the series, its anode 215 is connected to the positive supply line Vdd. In integrated circuit form, where the first gate is a common P-type substrate, the first gates of SCRs 216, 218 and 220 are also connected to ground through the substrate resistance. The protection circuit 212 operates in the same manner as the protection circuit 112, described above, except that the zener trigger operates on the lower SCR. It is to be understood that other triggering means such as stacked diodes can be used in place of the zener diode trigger so long as the appropriate triggering voltage and speed are maintained.

The I/O pin protection circuit 14 also comprises a plurality of SCRs, in this case three SCRs 36, 38 and 40. The SCR 36 at the top end of the series has its anode 37 connected to the positive supply line Vdd and its cathode 39 connected to the I/O pin 42. The bottom SCRs 38 and 40 are connected in series between the I/O pin 42 and the negative supply line Vss with the anode 41 of the SCR 38 being connected to the I/O pin 42 and the cathode 43 of the SCR 40 being connected to the negative power line Vss. Thus the three SCRs 36, 38 and 40 are connected in series between the supply lines Vdd and Vss with the I/O pin 42 being connected between the SCRs 36 and 38. The second gate 44 of the top SCR 36 is electrically connected to the negative line Vss through a zener diode 46 and is electrically connected to the positive line Vdd through a resistor 48. The first gate 45 of the top SCR 36 is also electrically connected to the negative power line Vss through a resistor 52. The second gate 54 of the second SCR 38 is electrically connected to the negative power line Vss through a zener diode 56 and is electrically connected to the positive power line Vdd through a resistor 58. The second gate 60 of the bottom SCR 40 is electrically connected directly to the negative power line Vss. The first gates (not shown) of the SCRs 38 and 40 are connected to ground through a resistor. Additional protection may be provided for the MOS transistors of the IC being protected by diodes 62 and 64 connected between the drains of the PMOS and NMOS output transistors of the IC being protected and the associated power lines.

In the operation of the circuit 10, under normal operating conditions the SCRs 36, 38 and 40 are in the off state. As previously described, the first gate 45 of the SCR 36 is tied to the negative power line Vss by the resistor 52 and the cathode 39 of the SCR 36 biased between the power lines Vss and Vdd by the input/output signal. This keeps the SCR 36 in the off state. If the potential of the I/O pin 42 is taken negative with respect to the negative power line Vss by a negative input transient, such as an ESD pulse, then the SCR 36 turns on as soon as the input pulse falls approximately 0.6 volts below the potential of the negative power line Vss, and clamps the I/O pin 42 to approximately 1.3 volts below the voltage of the positive power line Vdd.

In a similar manner, the SCR 38 is off under normal circuit operation and is biased on when the potential at the I/O pin 42 exceeds the potential of the positive power line Vdd by about 0.6 volts. This clamps the I/O pin 42 to approximately 2.6 volts above the potential of the negative power line Vss (the series on voltage of SCRs 38 and 40). During normal operation of the circuit 14, the bottom SCR 40 is biased to be in the on state as soon as current flows through SCR 38. Positive transients at the I/O pin 42 with the positive power line Vdd as common are clamped by the diode 62, which can either be formed by the parasitic diode from the drain of the PMOS output transistor to the N+ guard band, or may be a separate diode. Negative transients at the I/O pin 42, with the negative power line Vss as common, are clamped by the diode 64, which can either be formed by the parasitic diode from the drain of the NMOS output transistor to the P+ guard band, or may be a separate diode. Since the SCRs take a finite time of approximately 1 to 2 nanoseconds to reach the full low impedance on state, there may be a short overshoot transient at the I/O pin 42 which could damage the gate oxide of transistors connected directly to the I/O pin 42. This problem is overcome by the resistor 68 and zener diode 70 at the input. Also, the capacitance of the zener diode 70 and the transistors at the input serves to integrate the fast transient reducing rise time and amplitude. These components effectively clip the transient to a safe level before the SCRs fully turn on. When the SCRs are fully on, the voltage at the I/O pin 42 is lower than the voltage of the zener diode 70.

Figure 2:
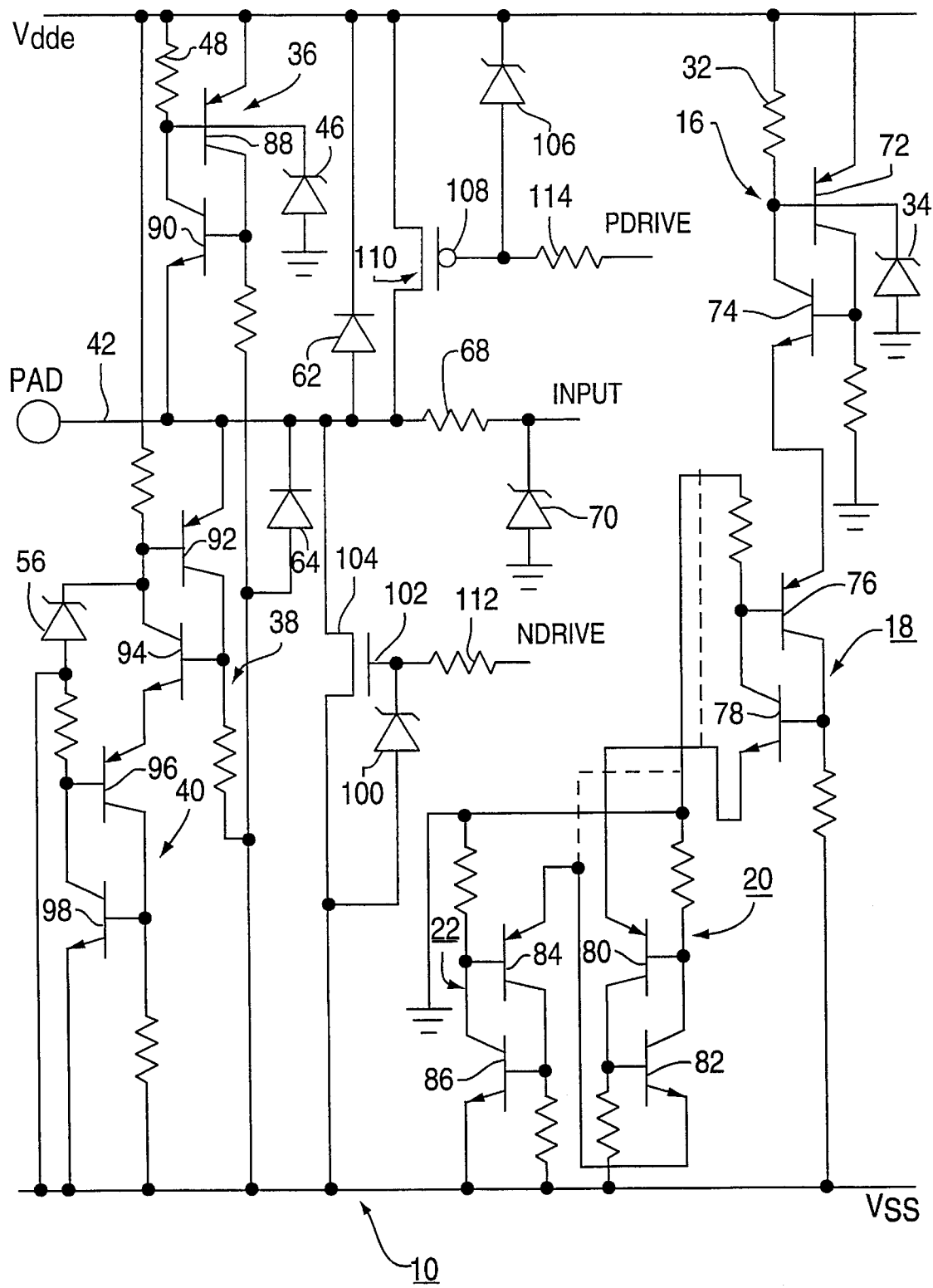
FIG. 2 is a circuit diagram showing the transistor equivalent of the circuit of FIG. 1.

The transistor equivalent to the circuit 10 shown in FIG. 1 is shown in FIG. 2. It is well known that an SCR can be represented by two bipolar transistors. Thus, in the power supply protection portion 12 of the circuit 10, the top SCR 16 if formed of two bipolar transistors 72 and 74. The other three SCRs 18, 20 and 22 are each made up of two bipolar transistors 76 and 78, 80 and 82 and 84 and 86 respectively. In the I/O pin protection portion 14 of the circuit 10, the top SCR 36 is made up of two bipolar transistors 88 and 90. The other two SCRs 38 and 40 are each made up of two bipolar transistors 92 and 94, and 96 and 98 respectively. In an IC, the various SCRs are constructed using four separate diffusions to form each SCR as a lateral SCR and not separate npn and pnp transistors. The various zener diodes are formed by using the lightly doped drain extensions diffusions of the MOS transistors of the circuit being protected and the heavier source/drain diffusions of the MOS transistors. These typically form a 6–7 volt zener diode. In FIG. 2, the alternative manner of connecting the three SCRs 18, 20 and 22, shown in FIG. 3 is indicated by dash lines.

To handle the large differential voltages between the core logic and the I/O leads, which can occur with high ESD transients, it is necessary to add zener diode clamps to the gates of the output MOS transistors of the circuit being protected. As shown in FIG. 2, the optimum connection for these components includes connecting a zener diode 100 between the gate 102 of the NMOS transistor 104 and the negative power line Vss, and connecting a zener diode 106 between the gate 108 of the PMOS transistor 110 and the positive power line Vdd. For optimum protection, the zener diodes 100 and 106 should be located close to the transistors 104 and 110 respectively. The series resistors 112 and 114 are normally polysilicon, and may be placed anywhere between the driver circuit and the gate of the respective output device.

Thus, there is provided by the present invention, a circuit for providing protection from ESD in an IC which protects both the power supply leads and the I/O leads. The protection for the power supply leads includes a plurality of SCRs connected in series between the power lines. The SCR at one end of the series has its second gate connected to the negative power line through a zener diode and the second gate of each of the other SCRs is connected directly to the negative power line. The protection circuit for the I/O pin includes a plurality of SCRs connected in series with one SCR being connected between the positive power line and the I/O pin and the other SCRs being connected in series between the I/O pin and the negative power line. The one SCR has its second gate connected to the negative power line through a zener diode and one of the other SCRs has its second gate connected to the negative power line through a zener diode.

I claim:

1. An ESD protection circuit comprising:
a pair of power lines
a plurality of SCRs electrically connected in series between said power lines, each of said SCRs having a gate;
a zener diode electrically connected between the gate of the SCR at one end of the plurality of SCRs connected in series and one of the power lines; and
means electrically connecting the gates of each of the other SCRs in the series other than the one SCR at the one end of the series to said one power line.

2. The protection circuit of claim 1 wherein the power lines include a positive polarity line and a negative polarity line and the gate of all of the SCRs are connected to the negative polarity line.

3. The protection circuit of claim 2 in which the gates of the other SCRs in the series are each connected directly to the negative power line.

4. The protection circuit of claim 2 in which each of the SCRs has a cathode and the gate of each of the other SCRs in the series is connected to the cathode of its respective SCR so as to be connected to the negative power line.

5. The protection circuit of claim 2 further comprising a resistor connected between the gate of the SCR at the one end of the series and the positive polarity line.

6. The protection circuit of claim 5 in which each of the SCRs has a cathode and an anode, the anode of the SCR at the one end of the series is directly connected to the positive power line and the cathode of the SCR at the other end of the series is connected to the negative power line.

7. The protection circuit of claim 6 in which there are at least three SCRs in the series.

8. The protection circuit of claim 7 in which the gates of all of the other SCRs in the series are connected directly to the negative power line.

9. The protection circuit of claim 7 in which the gate of each of the other SCRs in the series is electrically connected to the cathode of the respective SCR.

10. The protection circuit of claim 7 further comprising an I/O pin electrically connected between the SCR at the one end of the series and the next adjacent SCR in the series.

11. The protection circuit of claim 10 further comprising triggering means electrically connected between the gate of the next adjacent SCR in the series and the negative power line.

12. The protection circuit of claim 11 further comprising a resistor electrically connected between the gate of the next adjacent SCR in the series and the positive power line.

13. An ESD protection circuit comprising:
a pair of power lines;
an I/O pin;
a first plurality of SCRs electrically connected in series between the power lines;
a second series of SCRs electrically connected in series between the power lines with the I/O pin being connected between the SCR at one of the second series and the next adjacent SCR;
each of the SCRs of the first and second series having a gate, a cathode and an anode;
a separate zener diode electrically connected between the gate of the SCR at one end of each of the first and second series and one of the power lines; and
the gates of each of the other SCRs of each of the first and second series other than the one SCR at the one end of the series being electrically connected to the one power line.

14. The protection circuit of claim 13 wherein the power lines include a positive power line and a negative power line, and the gates of the SCRs are electrically connected to the negative power line.

15. The protection circuit of claim 14 further comprising a resistor connected between the gate of the SCR at the one end of each of the series of SCRs and the positive power line.

16. The protection circuit of claim 15 in which the anode of the SCR at the one end of each of the series of SCRs is electrically connected to the positive power line and the cathode of the SCR at the other end of each of the series of SCRs is electrically connected to the negative power line.

17. The protection circuit of claim 16 in which there are at least three SCRs in each of the series of SCRs.

18. The protection circuit of claim 17 in which the gates of all of the other SCRs in the first series of SCRs other than the one SCR at the one end of the first series are connected directly to the negative power line.

19. The protection circuit of claim 18 further comprising triggering means electrically connected between the gate of the SCR next adjacent the one SCR at the one end in the second series of SCRs and the negative polarity line.

20. The protection circuit of claim 19 further comprising a resistor electrically connected between the gate of the SCR next adjacent the one SCR in the second series of SCRs and the positive power line.

\* \* \* \* \*